July 26, 1932.  W. LERICHE ET AL  1,869,264
SPACING DEVICE
Filed March 28, 1931
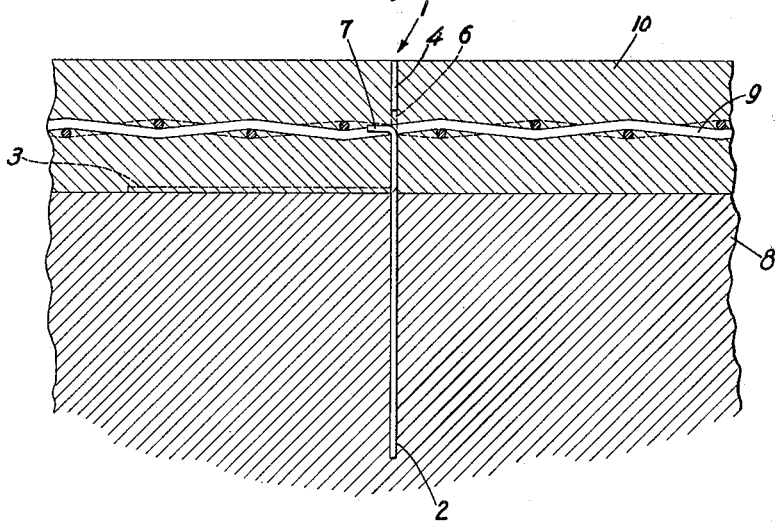
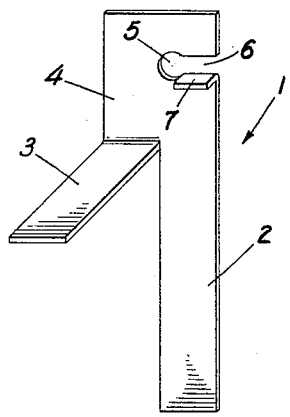 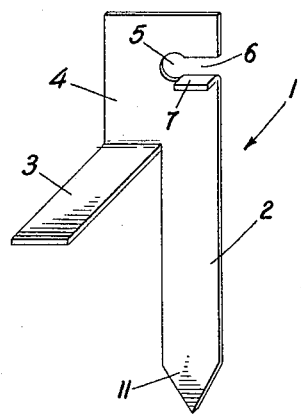
Willis Leriche and
Ira V. Beasley
INVENTORS.
BY  *Louis L. Amard*
their ATTORNEY Patented July 26, 1932

1,869,264

UNITED STATES PATENT OFFICE

WILLIS LERICHE, OF ALLENTOWN, PENNSYLVANIA, AND IRA V. BEASLEY, OF YUKON, OKLAHOMA, ASSIGNORS TO CEMENT-GUN CONTRACTING COMPANY, A CORPORATION OF DELAWARE

SPACING DEVICE

Application filed March 28, 1931. Serial No. 526,046.

This invention relates more particularly to the formation on a suitable backing or base of a layer of cementitious material reinforced by suitable means such as wire mesh. It has for its principal object the provision of a spacing device which determines the position of wire mesh with reference to the backing and provides means for gauging the thickness of the cementitious matter deposited on the backing.

The embodiment of the invention disclosed for purposes of illustration may be formed of sheet metals or other materials and at its lower end is split in two parts, one of which serves as a shank to be driven into a base or support and the other is bent into a position in which it is perpendicular to the shank and serves to limit the insertion of the shank into a support or backing. The rest of the device consists of a portion capable of serving as a gauge of the thickness of the cementitious material, being provided with suitable means for securing wire mesh or other reinforcing material in proper position between the outer and inner surfaces of the layer of cementitious material formed in connection with the use of the spacing device of the present invention. A spacing and gauging device of this form is easily made from a single piece of sheet metal and inasmuch as the device for limiting the extent of insertion of this shank has considerable surface area, this form of spacing device is of particular value when used to construct the layer on a backing of relatively soft material.

Other objects and advantages will appear upon consideration of the following description and of the drawing of which:

Fig. 1 is a sectional view illustrating one embodiment of the invention in a completed structure of the type specified;

Fig. 2 is a view of the spacing and gauging device taken alone; and

Fig. 3 is a view similar to Fig. 2 but showing a sharp shank adapted for use with harder backings.

Referring to the drawing 1 designates a preferred form of spacing and gauging device constructed according to the present invention and including a shank 2 to be driven into a suitable backing, a part 3 for limiting the extent to which the shank 2 is driven into the backing and a part 4 serving to gauge the thickness of the layer of cementitious material. The shank 2 and part 3 may be formed by splitting the lower end of a blank and turning up the part 3 until it is perpendicular to the part 2 and to the gauge portion 4. To determine the position of cementitious material the device 1 is provided within the limits of the part 4 with a circular opening 5 to receive a wire of the reinforcing wire mesh. Entrance of the wire to the opening 5 is provided for by means of slot 6 extending to edge of the device 1. As shown in Fig. 2 the slot 6 is formed by cutting through the material in a line extending from the opening 5 to the edge and then the material at the cut edge is turned back into a position perpendicular to the main plain of the device, thus leaving a wide slot and an offset or shelf 7 which may be of service in supporting the wire mesh and in binding together the "Gunite" and the combined spacing and gauging device.

In use the shank 2 of each device 1 is driven into a backing 8 of suitable material until the limiting part 3 comes into contact with the surface of the backing or base 8. The various spacing and gauging devices 1 serve to maintain a ply of wire mesh 9 in proper relation with respect to the surface of the backing 9, wires of the reinforcing wire mesh being positiond in the openings 5 of the various spacing and gauging devices. After the wire mesh has been properly spaced from the backing as indicated in Fig. 1 the cementitious material 10 is applied until there is formed a layer with its upper surface flush with the upper edges of the various gauging devices 4 forming part of the devices 1.

Although the cementitious material may be applied in different ways, it may be applied very advantageously by means of a "cement-gun" from which the material is blown through a hose and then hydrated at the nozzle just before the material is applied to the backing. The layer of material or "Gunite" is built up until the outer surface is flush with the top or gauge portion 4.

The combined spacing and gauging device of the present invention is particularly adapted for use where the backing is soft, for example where material, such as "Gunite", is applied directly against the dirt in lining irrigation ditches and the lining thus formed is thus, for example about one inch in thickness. In the event, however, that it is desired to use these facing and gauging devices in connection with a backing of harder material, the shank 2 may be provided with a pointed end 11 as indicated in Fig. 3.

It should be understood that various changes may be made in the construction and arrangement of the various parts and that certain features may be used without others without departing from the true scope and spirit of the invention.

Having thus described our invention, we claim:—

1. A spacing device for use in cement and concrete work containing plies of reinforcing material, including a shank to be driven into a support, an offset to limit the extent of driving, and an extension to gauge the thickness of the cement or concrete on said support, said extension having provisions for positioning a ply of reinforcing material intermediate the offset and the outer edge of the extension.

2. A spacing device including a flat shank, a gauge portion of greater width forming an extension of said shank, a flat positioning member at the lower edge of the gauge portion and at one side of the shank for limiting the insertion of the shank into a support, and means to cooperate with a ply of reinforcing material to determine its position between the positioning member and the outer edge of the gauge portion.

3. A unitary spacing device for use in forming on a backing a layer of cementitious material containing a reinforcing ply, said spacing device including an outer flat gauge portion for determining the thickness of the layer, a shank in the plane of the gauge portion and extending only partly across the same, and a part extending from the lower edge of the gauge portion at one side of the shank and substantially perpendicular thereto.

4. A spacing device of the character described including an elongated piece of flat material having an upper portion serving as a thickness gauge and having a reinforcement positioning slot extending inwardly from one edge thereof, and a lower portion split into a driving shank and a part at the side of the shank projecting substantially at a right angle to the plane of the shank and the gauge portion.

5. A spacing device for use in cement and concrete work containing plies of reinforcing wire mesh, including a shank to be driven into a support, an offset to limit the extent of driving, and an extension to gauge the thickness of the cement or concrete on said support, said extension having a lateral opening to receive a wire of said wire mesh and thereby hold the wire mesh in the desired position intermediate the offset and the outer edge of the extension.

6. A spacing device for use with reinforcing wire mesh, including a flat shank, a flat gauge portion of greater width forming an extension of said shank, and a flat positioning member at the lower edge of the gauge portion and at one side of the shank for limiting the insertion of the shank into a support, said gauge position having an opening therethrough to receive a wire of said wire mesh and an opening extending from one edge of said gauge portion to said opening to facilitate the insertion of the wire.

7. A unitary spacing device of flat material for use in forming on a backing a layer of cementitious material containing a reinforcing ply of wire mesh, said spacing device including a flat outer gauge portion for determining the thickness of the layer, a shank in the plane of the gauge portion and extending only partly across the same, and a flat part extending from the lower edge of the gauge portion at one side of the shank and substantially perpendicular thereto to limit the insertion of the shank, said gauge portion having an opening to receive a wire in said mesh, a slot connecting said opening with an edge of the gauge and a projection at the lower edge of said slot.

In testimony whereof we affix our signatures.

WILLIS LERICHE.
IRA V. BEASLEY.